United States Patent [19]

Arndt et al.

[11] Patent Number: 5,532,024

[45] Date of Patent: Jul. 2, 1996

[54] METHOD FOR IMPROVING THE ADHESION OF POLYMERIC ADHESIVES TO NICKEL SURFACES

[75] Inventors: Steven F. Arndt, Endwell; Luis J. Matienzo, Endicott; Irving Memis, Vestal; James Spalik, Kirkwood; Tien Y. Wu, Endwell, all of N.Y.

[73] Assignee: International Business Machines Corporation, Armonk, N.Y.

[21] Appl. No.: 431,545

[22] Filed: May 1, 1995

[51] Int. Cl.⁶ .................... B05D 3/00; B05D 3/12
[52] U.S. Cl. .................... 427/327; 148/277; 427/386; 427/387
[58] Field of Search .................... 427/327, 409, 427/410, 386, 387; 148/277

[56] References Cited

U.S. PATENT DOCUMENTS

| | | | |
|---|---|---|---|
| 2,689,785 | 9/1954 | Simon | 41/42 |
| 3,065,102 | 11/1962 | Hochberg | 427/327 |
| 3,166,444 | 1/1965 | Ehren et al. | 427/327 X |
| 3,513,015 | 5/1970 | Fitzpatrick et al. | 204/30 X |
| 4,422,907 | 12/1983 | Birkmaier et al. | 427/306 X |
| 4,929,422 | 5/1990 | Mahlkow et al. | 427/306 X |
| 5,061,315 | 10/1991 | Collier et al. | 427/409 X |

*Primary Examiner*—Michael Lusignan
*Attorney, Agent, or Firm*—Calfee Halter & Griswold

[57] ABSTRACT

The present invention provides a novel method for improving the adhesion of polymers, particularly adhesives, to nickel surfaces. The method involves contacting the nickel surface with a hydrogen peroxide solution having a temperature of at least about 40° C. for a time sufficient to form a wettable oxide surface having a water contact angle of less than about 10°.

17 Claims, No Drawings

METHOD FOR IMPROVING THE ADHESION OF POLYMERIC ADHESIVES TO NICKEL SURFACES

BACKGROUND OF THE INVENTION

Nickel and nickel coatings are highly desirable because of their appearance, low corrosivity, and resistance to particle release. Certain applications, particularly in the computer industry, call for the application of polymers such as adhesives to a nickel surfaces. For example, to remove the heat generated by computer chips, according to one technique, the chip is attached to a nickel plated heat sink using a thermally conductive adhesive. Unfortunately, the mechanical and thermal stresses to which the chip-heat sink package is subject during assembly, and subsequent usage, often cause adhesives to fail to adhere to the nickel surface. The adhesive delaminates at the interface of the adhesive and the nickel.

It would be desirable to have a method for improving the adhesion of adhesives to nickel surfaces.

SUMMARY OF THE INVENTION

The present invention provides a novel method for improving the adhesion of polymers, particularly adhesives, to nickel surfaces. The method involves contacting the nickel surface with a hydrogen peroxide solution having a temperature of at least about 40° C. for a time sufficient to form a wettable oxide surface having a water contact angle of less than about 10°.

DETAILED DESCRIPTION OF INVENTION

The present invention provides a novel method for improving the adhesion of polymers, particularly adhesives, to nickel. The enhanced adhesion is achieved by modifying the surface of the nickel layer with a hot hydrogen peroxide solution to form a wettable oxide coating. As used herein "hot hydrogen peroxide solution" has a temperature of at least about 40° C.

Preferably, before the parts are treated with the hot hydrogen peroxide, they are cleaned. Suitable cleaning methods include, for example, ultra sonic cleaning in isopropyl alcohol. Other water miscible cleaning solvents may be used prior to or separately from the isopropyl alcohol depending on the type and level of contamination on the nickel surface. For example, mineral oil may be removed by Simple Green, a concentrated industrial strength cleaner containing butyl cellosolve.

Preferably, before the parts are treated with the hot hydrogen peroxide, the parts are heated in deionized water having the same temperature as the temperature of the hot hydrogen peroxide.

It is preferred that the hot hydrogen peroxide solution be at least about 40° C. more preferably at least about 60° C. While there is no upper limit on the temperature of the hot hydrogen peroxide solution, evaporation of hydrogen peroxide increases above 104° C., which is the boiling point of the preferred 30% hydrogen peroxide solution. Thus, it more efficient to use hot hydrogen peroxide at temperatures below 104° C. Preferably, the hydrogen peroxide solution is from about 60° C. to about 100° C. Where the nickel to be treated is electrolessly plated nickel, the hydrogen peroxide is preferably from about 75° C. to about 85° C., more preferably about 80° C. Where the nickel to be treated is electroplated nickel, the temperature is preferably about 75° C. to about 90° C., more preferably about 80° C.

The duration of the hydrogen peroxide treatment varies inversely with the temperature; the hotter the hydrogen peroxide, the less treatment time is required. For electrolessly plated nickel, the time is preferably from about 1 minute to about 8 minutes, more preferably about one to four minutes, most preferably about two minutes. For electroplated nickel, the time is preferably about 2 to about 20 minutes, more preferably about 2 to 10 minutes, most preferably about 5 minutes.

Good results have been obtained using reagent grade solutions of hydrogen peroxide at from about 15% to about 30%. Increasing the concentration of the hydrogen peroxide beyond 30% will decrease the time needed for treatment, while decreasing the concentration below 15% will increase the time needed for the treatment. The hydrogen peroxide when fresh typically has a pH of about 3.3–3.5 although after continue use the peroxide becomes diluted and the pH can rise to 4.95–5.28.

The treatment with the hot hydrogen peroxide solution transforms the surface of the nickel into a nickel oxide layer; it is believed that the nickel oxide layer is hydrated. The hot hydrogen peroxide treatment enhances the ability of organic adhesives to chemically bond to the nickel surface. The thickness of the oxide layer may be controlled by varying the time and temperature of the hydrogen peroxide treatment. For electroless plated nickel, the reaction proceeds more quickly than with electroplated nickel and care must be exercised not to oxidize too deeply or strip the nickel layer. The depth of the oxide layer is controlled by varying the time and temperature of the hydrogen peroxide treatment.

Preferably, after the hydrogen peroxide treatment the parts are rinsed, preferably immediately after treatment, and dried.

After the hydrogen peroxide treatment, some or all of the parts are preferably tested to verify the nickel surface modification, by water contact angle measurements or the water break test. Preferably, the modified nickel surface should exhibit uniform wetting, with a deionized water wetting angle of less than 15°, more preferably less than 10°, most preferably about 0°.

Optionally, a coupling agent is applied to the part after the hydrogen peroxide treatment. While the adhesion of adhesives to nickel is improved by the hot hydrogen peroxide treatment, certain adhesives, such as the modified epoxy resin AI, from Dow Chemical Company, may delaminate over extended stressing. The coupling enhances the adhesion of the AI adhesive to the nickel surface particularly where the part is to be subjected to thermal stresses over time. Thus a coupling agent is preferred where the adhesive is AI. Suitable coupling agents include for example, epoxy silanes. A suitable epoxy silane is 3-glycidoxypropyl-trimethoxysilane available as Z 6040 from Dow Chemical, and amino silanes such as A 1100 from union carbide. It is preferred that the coupling agent be applied immediately after the hydrogen peroxide treated parts are dried. Preferably, the parts are dried in a heated air stream, most preferably the air is supplied at about 40° C. The parts are then immersed with gentle agitation into a solution containing coupling agent preferably about 1% to 5% coupling agent preferably in isopropanol, most preferably about 2% coupling agent, for 1 to 5 minutes, most preferably about 1 minute. The parts are rinsed, preferably in flowing deionized water for about 1 to 2 minutes. Preferably, excess water is blown off using compressed air or nitrogen. The parts are dried further in a stream of warm air, preferably at about 40° C. for 3 to 4 minutes. The coupling agent is preferably cured for 45 minutes to 90 minutes, most preferably for 60 minutes at 60° C. to 90° C., most preferably at 75° C.

Preferably, the parts are handled with gloves or finger cots on their edges only and packaged so that they did not touch or rub together. If several weeks elapse between the hot hydrogen peroxide treatment and the adhesive application, the parts are preferably cleaned again, preferably by ultrasonic agitation at ambient temperature for about five minutes in 70% isopropyl alcohol. Parts are then rinsed with flowing de-ionized water to remove any residual isopropyl alcohol and are preferably dried, preferably blown dry, with dry air or nitrogen. No further hydrogen peroxide treatment is necessary.

Adhesive is applied employing conventional techniques, according to design specifications, to the nickel surface in a pattern corresponding to the parts to be affixed to the nickel. Preferably, the adhesive is applied as a 2–4 mil thick coating.

The Adhesive

Preferably the adhesive is an organic polymeric adhesive. Suitable adhesives includes for example: silicone rubbers; epoxy resin cured by anhydrides; and adhesives containing carboxylic groups, such as polyesters, acrylates and their analogues. Preferred adhesives include for example: adhesives which contain one part epichlorohydrin bisphenol A epoxy resin and one part polypropylene glycol polymer with maleic anhydride, and hexahydrophthalic anhydride curing agent such as Scotchcast Brand Electrical Resin 5239 from 3M; Scothcast 283 resin from 3M; adhesives which contain a cycloaliphatic epichlorohydrin epoxy resin and methyl hexahydrophthalic anhydride, such as Hysol FP4510, from Dexter Corporation Industry California; and adhesives which contain modified epoxy resins, amine curing agents and inert fillers, such as AI 7655 from A. I. Technology, Inc. Princeton N.J. and a silicone rubber containing a vinyl/st dimethylpolysiloxane with aluminum oxide filler, such as available under the designation "TC3280G" from GE Silicones, Hudson, Ohio, manufactured by Toshiba Silicone Company, Japan; silicone rubber Q36605 from Dow Chemical; and silicone resin containing aluminum filler and hardener, such as resin M5531 and resin M5523 from Thermoset Plastics Inc., Indianapolis.

The Nickel Surface

The nickel surface includes any form of nickel, including for example pure nickel and nickel alloys including for example nickel-phosphorus alloys and thus as used herein, the term "nickel" includes nickel alloys. The nickel is solid nickel or plated nickel. The nickel can be electroplated or electrolessly plated on any suitable base including, for example, copper, aluminum, and aluminum alloys. The plating includes any conventional method, including, for example, nickel electrolessly plated by hypophosphite nickel (II) or borate nickel.

The following examples are typical examples that illustrate the method of the present invention and are not intended to limit the teachings set forth herein. The initial oxide layer of the nickel parts before hot hydrogen peroxide treatment, used in the following examples was about 35 angstroms. The initial oxide layer varies among parts and vendors.

EXAMPLE 1

Heat sinks comprised of a layer electrolessly plated nickel on an aluminum base, were ultrasonically cleaned using a Branson 5,200 cleaner from Branson Corporation for about five minutes at from about 35° to 40° C. in about 50 ml of analytical grade isopropyl alcohol. After the ultrasonic cleaning, the parts were rinsed with flowing de-ionized water for about one minute at room temperature to remove the residual isopropyl alcohol. Next, the parts were preheated in about 50 ml of de-ionized water at about 80° C. for about one minute. The parts were placed in 50 ml of a 30% weight/weight BDH Analar hydrogen peroxide solution at 80° C. for about two minutes. A continuous stream of small bubbles were observed evolving from the surface of the parts. Next the parts were rinsed with 100 ml of de-ionized water at room temperature with agitation for about one minute. The parts were then dried using dry nitrogen. The parts had a slight gray cast as compared to untreated parts and an oxide coating of about 600–800 angstroms thick.

Selected parts were then evaluated for water contact angle measurements, SEM, water break test, and atomic profiling. A water break test was performed on parts and to verify that the parts had uniform wettability. The results of the elemental profile are shown below in Table I. Deflection tests were also conducted and the results are shown in Table III.

EXAMPLE 2

Parts comprised of nickel electroless plated on aluminum cleaned as in Example 1, were placed in a beaker of 30% hydrogen peroxide. The beaker was brought to a boil and held for five minutes. The parts were removed and examined visually and the oxide thickness was measured. The parts had a blue cast about and the nickel oxide layer was about 600 to 800 angstroms thick.

EXAMPLE 3

Heat sinks comprised of a layer of electroplated nickel on an copper base, were ultrasonically cleaned using a Cole-Parmer 8851 ultrasonic cleaner from Cole-Parmer Corporation for about five minutes at 40° C. in 70% isopropyl alcohol, with occasional agitation. After the ultrasonic cleaning, the parts were rinsed with flowing de-ionized water for about five minutes at room temperature to remove the residual isopropyl alcohol. Next, the parts were preheated in de-ionized water at about 80° C.–82° C. in a water bath for about five minutes. The parts were then placed in a 30% weight/volume BDH Analar hydrogen peroxide solution at about 80° C.–82° C., in the same water bath for about five minutes. A continuous stream of small bubbles was observed evolving from the surface of the parts. Next the parts were rinsed with flowing deionized water at ambient temperature with occasional agitation for about five minutes. The parts were then air dried.

Selected parts were then evaluated for water contact angle measurements, SEM, water break test, and atomic profiling. The parts had uniformly wettable surfaces as determined by the water break test. These parts were also evaluated in the Relative Adhesion Test described below.

EXAMPLE 4A–4D

Parts comprised of nickel electroplated on copper were treated as in Example 3 except that in addition to the 30% hydrogen peroxide solution, 15%, 20%, 25% hydrogen peroxide solutions were used. All the parts had uniformly wettable surfaces as determined by the water break test.

EXAMPLE 5

Parts comprised of nickel electrolessly plated using a high phosphorus plating solution as well as from a low phosphorus solution on copper were treated as in Example 3. The parts had uniformly wettable surfaces as determined by the water break test.

EXAMPLE 6

Parts comprised of nickel electroplated on copper were treated as in Example 3 except that after the parts were dried. The parts were then placed in a Delrin Vacuum Dryer Carrier and pre-dried for about 45 to about 60 seconds using compressed air. Next, the parts were dried with heated for about 15 minutes. The parts were dipped into a 5 % solution of Z6040 coupling agent from Dow Chemical company about 1 minute with agitation, removed, drained, rinsed with flowing deionized water for about 1–2 minutes. Compressed air was used to blow off the excess water. The parts were dried with warm air for about 3–4 minutes. The parts were cured at about 75° C. for about one hour. The parts had uniformly wettable surfaces as determined by the water break test.

EXAMPLES 7A–F

Parts comprised of nickel electroplated on copper were treated as in Example 4 except that the temperature of the peroxide was 60°, 80° and 90° C. and the times of peroxide treatment varied from 2, 5 and 20 minutes. The various times and temperatures are shown in Table I. X-ray photoelectron spectroscopy was used to examine the surface composition of selected parts; the results are shown below in Table I. The parts had uniformly wettable surfaces as determined by the water break test.

TABLE I

| Example | Temp. °C. | time (min) | OXIDE (A°) | % C | % O | % Ni | % S | % P | % Su | % Cl |
|---|---|---|---|---|---|---|---|---|---|---|
| 7A | 90 | 20 | 50 | 40 | 38 | 11 | 1.3 | 2.2 | 4.8 | 0.4 |
| 7B | 80 | 5 | 50 | 46 | 36 | 9.4 | 1.2 | 3.5 | 3.8 | N/A |
| 7C | 90 | 2 | 75 | 44 | 38 | 12 | 0.9 | 3.2 | 1.8 | N/A |
| 7D | 80 | 5 | 50 | 54 | 29 | 13 | 2.0 | 0.5 | N/A | N/A |
| 7E | 60 | 2 | 75 | 38 | 38 | 19 | 0.3 | 2.5 | 1.7 | N/A |
| 7F | 60 | 20 | 75 | 40 | 41 | 11 | 1.2 | 2.6 | 4.0 | N/A |

COMPARATIVE EXAMPLES

Comparative Example A

To determine if the improved adhesion could be obtained by forming an oxide coat such as by heating, sample parts comprised of electrolessly plated nickel on aluminum were placed in an oven and heated to about 200° C. for about one hour.

The heated parts did not exhibit wetting nor did they demonstrate improved adhesion of a adhesive, specifically Scotchcast adhesive, to the nickel as determined by the deflection test.

Comparative Example B

Heat sinks comprised of electrolessly plated nickel or aluminum were treated as in Example 1, except that instead of hydrogen peroxide treatment the parts were subjected to hot isopropyl alcohol treatment.

The parts did not display the wetting characteristic of the hot hydrogen peroxide treated parts. The elemental composition of the nickel surface was determined. The results are shown in Table II.

Comparative Example C

Heat sinks comprised of electrolessly plated nickel were treated as in Example 3 except that the hydrogen peroxide solution was at ambient, that is about 20° C. No effervescence was observed when the parts were in contact with the hydrogen peroxide. The parts did not exhibit wettability and failed the water break test.

Comparative Example D

Hot hydrogen peroxide treated parts of Example 3 were placed in an oven and heated to about 200° C. for about 12 hours. The parts were subject to the water break test did not exhibit wettability and increased wetting angle was observed.

Comparative Example D

Control parts were treated as the above examples except that they did not receive any hydrogen peroxide treatment. The parts did not display the wetting characteristic of the hot hydrogen peroxide treated parts.

Evaluation of the Hot Hydrogen Preoxide Process

The following results represent typical results; in some instances the results represent averages or ranges. It is to be understood that the test results of a individual part could vary; particulary since reults tend to vary among parts supplied by different vendors.

Verification of Surface Modification of Nickel

X-ray photoelectron spectroscopy was used to examine the surface of the nickel layers of selected parts treated according to the method of Example 1 and Comparative Example B and compared to non-hydrogen peroxide treated control parts. This spectroscopy method provides information as to the elemental composition of the top 50 to 100 angstroms of a surface. Since the position of the photoelectron lines is sensitive to chemical environments, it is also possible to determine the chemical changes produced on a surface layer as a function of chemical modification. To determine the thickness of the modification to the nickel layer, an ion beam was used for depth profiling in conjunction with the x-ray photoelectron spectroscopy analysis. The results of the surface composition, expressed as atomic percentages are shown below in Table II.

TABLE II

| | Elemental Composition of Nickel Surfaces | | | | | | | |
|---|---|---|---|---|---|---|---|---|
| Example Treatment | % C | % O | % Ni | % P | % N | % Al | % Zn | Oxide Thickness A° |
| untreated Control | 44.4 | 43.5 | 6.2 | 5.0 | — | — | 0.9 | 160 |
| IPA (Comp. Ex. B) | 36.3 | 52.9 | 8.4 | 1.0 | — | — | — | 160 |
| Hydrogen | 30.7 | 54.2 | 9.6 | 3.0 | 0.8 | 1.7 | — | 640 |

TABLE II-continued

Elemental Composition of Nickel Surfaces

| Example Treatment | % C | % O | % Ni | % P | % N | % Al | % Zn | Oxide Thickness A° |
|---|---|---|---|---|---|---|---|---|
| Peroxide (Ex. 1) | | | | | | | | |

As can be seen from Table II, the percent of oxygen and nickel in the oxide portion of the nickel parts increase following both the hot isopropyl alcohol and hot hydrogen peroxide treatment. However, the hot hydrogen peroxide significantly increases the depth of oxidation in the nickel layer.

High resolution x-ray photoelectron spectroscopy spectra of the Ni2p and P2p regions of the spectrum for the samples of Example 1 prior to ion beam profiling revealed that the control sample contains two nickel "environments" associated with the nickel oxide over nickel metal. Since the reduced nickel was detected, the nickel oxide layer must be fairly thin, that is less than about 100 angstroms. A similar analysis of the P2p region of the spectrum reveals that the phosphorus incorporated in the oxide layer is mainly reduced by a small amount of oxidized phosphorus is also present within the deposit. These results correlate with the expected composition of an electroless layer of nickel produced according to the method of K. L. Lynn and P. J. Lai, *Journal Electrochem. Soc.* 136, 38093 (1989), using a solution of nickel ions and hypophosphite ions.

As a result of the treatment with the hydrogen peroxide, it is believed that the nickel surface on parts is transformed into a hydrated nickel oxide. When the nickel is an alloy which contains phosphorus, the reduced phosphorus species is fully transformed into oxidized phosphorus. Although the comparative treatment with hot isopropyl alcohol also oxidizes the nickel, it does not fully transform the reduced phosphorus atom nor does the isopropyl alcohol improve adhesion of the adhesives to nickel. In addition, the hydrogen peroxide treatment results in a thicker oxide layer on the nickel layer, than does the hot isopropyl alcohol treatment.

Particle Release Test

Selected parts treated according to Example 1 were placed in a solution of water and sonicated. The same procedure was performed using non-treated control parts. The particles in each solution were then counted using a liquid particle counter. The hydrogen peroxide parts did not release more particles than did the control parts.

Wettability Test

A water break test was performed on all the parts of all the examples according to ASTM B-322-68. The parts were immersed in water and then inspected visually for evenness of wettability and resistance to beading.

All the hot hydrogen peroxide parts from Examples 1–7 displayed clean breaking, that is the water did not bead, nor pull away from the edges. The hot hydrogen peroxide treatment resulted in uniform wettable nickel surfaces giving 100% coverage by the water break test.

Contact Angle Test

Advancing deionized water contact angle measurements were also conducted with a goniometer with an optical protractor using a sessile drop technique. The parts of Example 1 all displayed bond angles of less than 10°. Typically, the water dissipated to the point where bond angles could not be measured and thus the water contact angle was about 0°.

SEM

Morphology studies of the hot hydrogen peroxide treated parts of Example 1 were conducted using scanning electron microscopy. Visual analysis indicated that the hot hydrogen peroxide treatment did not alter the morphology of the surface of the nickel.

Evaluation of Adhesion of Adhesive to Nickel Layer

Select parts from the above examples were evaluated for the adhesion of the adhesive to the nickel. Parts from Example 1, were screen coated with Scotchcast adhesive. Parts from Example 3 were coated either with AI adhesive or silicone adhesive.

Deflection Test

AI adhesive was applied to the heat sinks of Example 1. A chip was applied atop the adhesive to provide a chip-adhesive-sandwich structure. The adhesive was cured. A silicone rubber pad was placed between the backside of the heat sink and the press to provide a cushion for the sandwich structure. The sandwich structure was supported only on the peripheral sides with a cavity in the center to accommodate the chip. A testing device capable of applying both compressive force and tensile force, such as available under the trademark "Instron®" was used to apply pressure on the heat sink side of the sandwich structure. The part was deflected downward, which induced stress at the chip adhesive interface and at the adhesive—heat sink interface. The extent of deflection was recorded. The sandwich structures were then checked for delamination at the nickel adhesive interface by use of a computerized scanning acoustic microscopy (CSAM). The results are summarized below in Table III.

TABLE III

Comparison of Adhesion of Adhesive to Nickel Layer as Measured by % Delamination

| Deflection (mils) | Non-Hydrogen Peroxide Treated Parts % Delamination | Hydrogen Peroxide Treated Parts % Delamination |
|---|---|---|
| 1 | 0 | 0 |
| 2 | 0.2 | 0 |
| 3 | 4.0 | 0 |
| 4 | 8.0 | 0 |
| 5 | 20.0 | 0 |
| 6 | 38.0 | 0.2 |
| 7 | 60.0 | 5.0 |
| 8 | 72.0 | 14.0 |

Parts treated as in Example 1, but varying the peroxide treatment times from 1 to 8 minutes showed similar results.

As can be seen from Table III, the hydrogen peroxide treatment provided improved adhesion between adhesive and nickel. When heat sinks were deflected at 5 mils, 20% of the adhesive area delaminated in non-hydrogen peroxide treated parts delaminated but none of the hydrogen peroxide treated parts delaminated. At a deflection of 8 mils, 72% of the adhesive area of the non-hydrogen peroxide treated parts had delaminated, yet only 14% of the adhesive area of the hydrogen peroxide treated parts had delaminated. Parts from Comparative Example A, which received heat treatment but no hydrogen peroxide treatment, performed the same as the non-treated control parts.

The force, in newtons, required to deflect the part was also measured. The untreated control parts typically show delamination at an applied force of less than 300 newtons. The hydrogen peroxide treated parts were capable of withstanding 535 newtons before the onset of delamination. The 300 newton force corresponded to 3 mil deflection and the 535 newton force corresponded to 6 mil deflection. Thus, the parts of Example 1 were deflected up to 6 mil before delaminating.

The parts of comparative Example A which were coated with Scotchcast adhesive were also subjected to the deflection test. These parts showed no improved adhesion as compared to the untreated control parts. The parts from comparative Example A all delaminated at the nickel-adhesive interface.

Computerized Scanning Acoustic Microscopy

Computerized scanning acoustic microscopy is a noninvasive technique that uses ultrasound to examine the adhesive-nickel interface. Selected parts from the above Examples were coated with adhesive and subjected to stress. Parts from Example 1 were coated with Scotchcast adhesive that were subjected to stress showed no sign of delaminating at the nickel-adhesive interface. Similarly, parts Example 3 were coated with silicone adhesive that were subjected to stress showed no sign of delaminating at the nickel-adhesive interface.

Stud Pull Test

A pull test was conducted in which selected parts from Example 1 were coated with Scotchcast adhesive and a chip applied to the adhesive. The adhesive was cured, then the chip and heat sink were placed in a device that firmly held the heat sink and only allowed region with the chip to move, that is, deflect. The device was unable to separate the chip and heat sink unless some shear was introduced by controlled area deflection.

Relative Adhesion Test and % Cohesive Failure Analysis

Selected parts of the above Examples were used to assemble chip-adhesive-heatsink or heatsink-adhesive-heatsink sandwich structures. The adhesive used was either the AI adhesive or Ge silicone rubber adhesive. Control structures were assembled using non-hydrogen peroxide treated parts. After the adhesive cured, the sandwich structures were pulled apart at a fixed rate of pull, using the Instron® tensile testing device. The device recorded and plotted the force at which the structures separated. Also, the fractured surfaces of the structures were examined visually. When the parts were separated, there was either: a failure at the nickel-adhesive interface which is designated 100% adhesive failure, or 0% cohesive failure; or a failure within the adhesive, known as cohesive failure. If the failure resulted in a portion of the adhesive stuck to the part, then the percent of adhesive stuck to the part gave a percent cohesive failure. 100% cohesive failure was the optimum result since it meant 100% of the nickel surface was covered with adhesive and thus, there was 0% failure at the interface.

Parts from Example 3 were used to assemble sandwich structures. Typically in the control structure, 100% of the parts separated at the nickel-adhesive interface. The control parts had a 100% adhesive failure; none of the adhesive adhered to the nickel. Some batches of control parts from some vendors had cohesive failure rates from 5–30%. However in structures using the parts of Example 3, the cohesive failure increased to greater than 90% often 100%, that is more than 90% of the adhesive remained on the nickel surface. This demonstrates that the hydrogen peroxide significantly improved the adhesion between the adhesive and the nickel surface.

Similar results were obtained in the structures in which the silicone rubber adhesive was used. The control structures all separated at the nickel-adhesive interface. Indeed, control structures could be easily peeled apart by hand. However, the hot hydrogen peroxide treated structures separated within the adhesive layer.

In addition to the chip adhesive heat sink structure, a heat sink—AI adhesive-heat sink structure was assembled and separated. Less than 10% of the structures separated at the nickel-adhesive interface, that is, more than 90% separated within the adhesive layer. In some runs with heat sinks from a different manufacturer, 100% of the fractures occurred within the adhesive. Similar results were obtained in the structures in which the silicone rubber adhesive was used.

Parts from Comparative Example C which were treated with ambient temperature hydrogen peroxide, were used to form sandwich structures. The structures were peeled apart by hand; they separated at the nickel adhesive interface.

The electrolessly plated parts from example 4 were coated with the AI adhesive and subjected to the Relative Adhesion test along with non-hydrogen peroxide treated control parts. The results are shown below.

TABLE IV

| Example | | % Hydrogen Peroxide | RAU | % C Fail |
|---|---|---|---|---|
| — | Av | 0% | 381 | 0% |
| | 1 | 0% | 749 | 0% |
| | 2 | 0% | 45 | 0% |
| | 3 | 0% | 350 | 0% |
| 4A | Av | 15% | 596 | 93% |
| | 1 | 15% | 617 | 90% |
| | 2 | 15% | 722 | 95% |
| | 3 | 15% | 451 | 95% |
| 4B | Av | 20% | 495 | 42% |
| | 1 | 20% | 114 | 0% |
| | 2 | 20% | 483 | 45% |
| | 3 | 20% | 880 | 80% |
| 4C | Av | 25% | 575 | 81% |
| | 1 | 25% | 546 | 100% |
| | 2 | 25% | 225 | 54% |
| | 3 | 25% | 653 | 90% |
| 4D | Av | 30% | 897 | 90% |
| | 1 | 30% | 746 | 89% |
| | 2 | 30% | 1270 | 95% |
| | 3 | 30% | 674 | 90% |

RAU - relative adhesion units from Relative Adhesion test

The parts from Example 5 were used to assemble cover plate—AI adhesive-cover plate structures as were non-hydrogen peroxide treated control parts. The high phosphorus parts control parts had a cohesive failure of about 15%; that is only about 15% of the adhesive remained on the nickel surface when separated. In contrast the hydrogen peroxide treated parts had a greater than 90% cohesive "failure", that is, more than 90% of the adhesive adhered to the nickel. The low phosphorus parts control parts had a cohesive failure of about 0% that is none of the adhesive adhered to the nickel. The hydrogen peroxide treated parts had a greater than 90% cohesive failure, that is, more than 90% of the adhesive adhered to the nickel.

Parts from Comparative A were formed into a heatsink-scotchcast adhesive-heatsink structure and pulled apart, using knife. The parts separated at the nickel-adhesive interface.

Extended Testing

Extended testing was used to determine the performance of adhesives on the hot hydrogen peroxide treated nickel surfaces in conditions that the parts could potentially be subject to in use.

Parts from Example 3 were coated with silicone adhesive GETC32080G and subjected to the following extended tests: 500 hours at 125° C.; 500 hours at 150° C.; 286 hours at 175° C.; 500 hours at 85° C. with 80% relative humidity; and 500 cycles from 65°– 150° C. After the testing, none of the samples showed delamination at the adhesive-nickel interface.

Parts from Example 1 coated with Scotchcast adhesive were subject to thermal cycling for typically ten cycles and examined by computerized scanning acoustic microscopy. The hydrogen peroxide treatment parts showed no signs of delamination.

Parts from Example 3 were coated with AI adhesive and subjected to thermal cycling and the results are discussed below.

Evaluation of Coupling Agent

In certain applications, the structure containing the nickel-adhesive are subjected to thermal and mechanical stresses. Certain adhesives may delaminate over time. For example, AI adhesives, when subjected to extended thermal stress, delaminate at the interface.

The AI adhesive was applied to parts treated in Example 6; such parts received a coupling agent after the hydrogen peroxide treatment. Part-adhesive-part sandwich structures were assembled. The adhesive was allowed to cure. Non-hydrogen peroxide treated control parts were used to make similar sandwich structures. Thereafter, the structures were separated and the separation point examined.

The sandwich structures made from the parts of Example 6 which were treated with hot hydrogen peroxide and a coupling agent, demonstrated 100% cohesive "failure" on parts from one vendor and 80–95% with nickel parts from another vendor. X-ray photoelctron spectroscopy was used to examine the surface composition of selected parts; the results are shown below in Table V.

TABLE V

| Example Treatment | Elemental Composition of Nickel Surfaces | | | | | | | |
|---|---|---|---|---|---|---|---|---|
| | % C | % O | % Ni | % Cu | % Si | % S | % P | % Cl |
| NONE Control | 53.6 | 28.4 | 12.9 | 1.6 | 0.0 | 2.3 | | 0.2 |
| no rinse | 48.6 | 40.4 | 2.4 | 0.7 | 7.4 | 0.2 | 0.8 | |
| 5 sec. rinse | 31.0 | 42.4 | 21.8 | 0.9 | 2.5 | 0.6 | 0.9 | |
| 30 sec. rinse | 31.2 | 42.4 | 22.2 | 0.9 | 1.6 | 0.7 | 1.3 | |
| 5 min. rinse | 32.0 | 45.1 | 18.7 | 1.6 | 0.9 | 0.4 | 1.2 | |

The surface composition from the above table indicate that the silane from the coupling agent is attached to the nickel surface. Although the silicon percentages depend upon the rinsing time, in all cases the silicon 2p signal had a binding energy of 102 eV. This signal indicates the presence of silicon oxygen-carbon bonds.

Sandwich structures comprising parts from Example 6 were also subjected to thermal stress by subjecting the structures through three 220° C. heat cycles. Sandwich structures assembled from parts from Example 3 were also to subjected to the heat cycles as were control sandwich structures. The results are shown below.

TABLE VI

Response of Parts of Examples 3 and 8
Coated with AI Adhesive to Thermal Stress

| Treatment | Sample Size | Cohesive Fraction |
|---|---|---|
| untreated controls | 100 | 0–10% |
| hydrogen peroxide | 100 | 20–80% |
| hydrogen peroxide & coupling agent | 100 | 75–100% |

Extended thermal aging tests were also conducted. The extended thermal test showed that hot hydrogen peroxide treated parts and hot hydrogen peroxide with coupling agent treated parts, the adhesion at the nickel interface enables the structures to withstand 125° C., for 500 hours. Untreated structures delaminated and some completely separated under such conditions. However, at 150° C., the hydrogen peroxide parts begin to delaminate at less than 500 hours, while the structures assembled from parts treated with hydrogen peroxide and coupling agent maintained their integrity.

Similar results have been obtained with the amino silane coupling agent A 1100 from Union Carbide.

The hot hydrogen peroxide treatment of the present invention significantly improves the adhesion between adhesives, and nickel surfaces. It is believed that the hot hydrogen peroxide treatment of the present invention removes surface contaminants, modifies the surface nickel layer to specific depth without altering the bulk properties of the nickel layer and without removing material from the nickel layer, and produces nickel surfaces that are more chemically reactive, with chemical groups present in the adhesives particularly in anhydride-cured epoxy adhesives. It is believed that as a result of the hot hydrogen peroxide treatment, the water in the hydrated oxide layer interacts with adhesives. However, for whatever reasons, the simple oxide layer of the type obtained by heating as in comparative Example A does not provide the wettable nickel surface having increased adhesion which is obtained with the hot hydrogen peroxide process.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for improving the adhesion of polymer to nickel comprising the following steps:
   (a) providing a nickel surface;
   (b) providing a polymer;
   (c) contacting the nickel surface with a hydrogen peroxide solution having a temperature of at least about 40° C. for a time sufficient to form a wettable nickel-oxide surface on the nickel surface;
   (d) applying the polymer to the nickel-oxide surface.

2. The method of claim 1, further comprising the step of cleaning the nickel surface with isopropyl alcohol prior to contacting the nickel surface with the hydrogen peroxide.

3. The method of claim 1, further comprising the step of rinsing the nickel surface after contacting the nickel substrate with the hydrogen peroxide.

4. The method of claim 1, wherein the polymer is an adhesive.

5. The method of claim 4, wherein the adhesive is a thermally conductive adhesive.

6. The method of claim 4, wherein the adhesive comprises a modified epoxy resin and filler.

7. The method of claim 4, wherein the adhesive comprises a silicone rubber.

8. The method of claim 7, wherein the adhesive further comprises an aluminum oxide filler.

9. The method of claim 4, wherein the adhesive is an acrylate.

10. The method of claim 4, wherein the adhesive comprises cycloaliphatic epichlorohydrin epoxy resin and methyl hexahydrophthalic anhydride.

11. The method of claim 4, wherein the adhesive comprises epichlorohydrin bisphenol A epoxy resin, polypropylene glycol polymer, maleic anhydride and hexahydrophthalic anhydride.

12. The method of claim 1 wherein the temperature of the hydrogen peroxide is at least about 70° C.

13. The method of claim 1, characterized in that the hydrogen peroxide treated nickel surface has an oxide layer at least about 50 angstroms thick.

14. A method for improving the adhesion of polymer to nickel comprising the following steps:

(a) providing a nickel surface;

(b) providing a polymer;

(c) contacting the nickel surface with a hydrogen peroxide solution having a temperature of at least about 40° C. for a time sufficient to form a wettable nickel-oxide surface on the nickel surface;

(d) thereafter contacting the nickel oxide surface with a coupling agent;

(e) applying the polymer to the coupling agent.

15. The method of claim 14, wherein the coupling agent is an epoxy silane coupling agent.

16. The method of claim 14, wherein the coupling agent is an amino silane coupling agent.

17. The method of claim 14, wherein the hydrogen peroxide temperature is from about 75° C. to about 95° C.

* * * * *